United States Patent
Leonowich et al.

(12)

(10) Patent No.: US 6,834,085 B1
(45) Date of Patent: Dec. 21, 2004

(54) LOW POWER SIGNAL DETECTION FOR AUTONEGOTIATION

(75) Inventors: Robert Henry Leonowich, Muhlenberg Township, Berks County, PA (US); Ayal Shoval, Whitehall, PA (US); Matthew Tota, Clinton, NJ (US)

(73) Assignee: Agere Systems Inc., Allentown, PA (US)

( * ) Notice: Subject to any disclaimer, the term of this patent is extended or adjusted under 35 U.S.C. 154(b) by 1136 days.

(21) Appl. No.: 09/006,808

(22) Filed: Jan. 14, 1998

(51) Int. Cl.[7] .......................... H04L 27/06; H04L 23/00
(52) U.S. Cl. ..................................... 375/316; 375/377
(58) Field of Search ............................... 375/377, 219, 375/222, 316, 345; 330/250

(56) References Cited

U.S. PATENT DOCUMENTS 5,566,022 A  * 10/1996 Segev ........................ 359/159

* cited by examiner

Primary Examiner—Tesfaldet Bocure

(57) ABSTRACT

A multiple data-rate receiver uses a signal rate detection technique that employs comparators to obtain information on the incoming data rate for enabling the appropriate receiver. Once a data rate is determined, only then is the appropriate receiver activated. Hence, power dissipation is kept to a minimum during the autonegotiation phase. This is a significant improvement over existing art which require two (or more) receivers to be active during the autonegotiation phase, consequently demanding high power dissipation. Because the autonegotiation phase can be lengthy, the present technique is preferable in many cases.

11 Claims, 2 Drawing Sheets

ANALOG 100 TX RECEIVER

DIGITAL 100 TX RECEIVER

LOW POWER SIGNAL DETECTION FOR AUTONEGOTIATION

BACKGROUND OF THE INVENTION

1. Field of the Invention

The present invention relates to a receiver that automatically determines the data rate.

2. Description of Prior Art

To transmit digital data over a link, such as a twisted-pair copper cable, a transceiver is required. A transceiver contains a local transmitter which broadcasts the digital information over the link and a local receiver which receives information on the link sent by a remote transmitter. The receiver re-creates the information sent by the remote transmitter by compensating for the losses induced by the link on the transmitted signal. Proper operation requires that both transmitter and receiver are configured to transmit and receive information according to a prescribed line code and data rate. For example, in Ethernet applications common transceivers can support 10 Mb/s (Manchester code) or 100 Mb/s (MLT3 code). In multi-rate transceiver circuits, it is possible to support more than one data rate (line code). For example, a "10/100" Ethernet transceiver must accommodate both 10 Mb/s and 100 Mb/s data traffic. Hence, a transceiver must have the capability to decide which mode of operation it is to support for a given link. The decision process is termed "autonegotiation". During autonegotiation, the two transceivers on opposite ends of the link communicate by transmitting information encapsulated within a periodic burst of closely spaced pulses. These pulses are termed "fast link pulses" (FLPs), and are defined by IEEE standard 802.3. Based on the information conveyed by the pulses (frequency, number), both receivers can decipher what line code capabilities the remote transceiver can support. Once this is known, both transceivers are placed in a line code mode that both can support. If they can support more than one line code, the common capability that is chosen depends on an established priority.

Since autonegotiation is a relatively new feature, native transceivers do not support this protocol. Thus another mechanism is required to determine the capability of the link partners. This mechanism involves a signal detect circuit that monitors the incoming signals to decide which line code is being transmitted. Typically if a link is not established, a transceiver is in the idle state, in which case it sends certain distinct patterns. These patterns can be detected by the receiver to decide the remote transmitter line code. Notice that the more line codes one must support, the harder it is to establish which line code is being received based on the data being received. Hence the need for the autonegotiation protocol. The combination of the signal detect mechanism and the autonegotiation mechanism is termed "parallel detection".

When a transceiver is powered up it must constantly remain in this parallel detection mode (i.e. "listen to the wire"). In many situations this state can be lengthy, thus it is necessary to keep power dissipation low during this state as the transceiver is not performing any data transfers but idle. Typical solutions for parallel detection circuitry in 10/100 transceivers is to turn on both the 10 Mb/s receiver and the 100 Mb/s receiver and based on their outputs decide on a common capability between the link partners. Unfortunately, this solution requires significant power. In fact, this idle state dissipates more power than the operating mode, since once a common capability is established, only one receiver is powered up (10 or a 100, not both).

FIG. 1 shows an embodiment of a typical 10/100 receive architecture to achieve parallel detection, which is usually implemented on a single integrated circuit (IC) in present-day designs. As used herein, a 10 Base-T transceiver is also referred to as "10BT", a 100 Base-TX transceiver as "100TX", and a 100 Base-T4 transceiver as "100BT4". During autonegotiation both receivers 101 and 102 are active, and supply their output signals to the parallel detect block 103. The output of the 10BT (10 Mb/s) receiver 101 goes to the FLP block 104, which monitors the received signal. If proper pulse bursts are detected with the correct frequency and number, the FLP block will determine which of links 100TX or 10BT to establish by asserting or de-asserting the FLP signal, which causes the control block (107) to assert either the 100TX or the 10BT signal, respectively. An asserted 100TX signal (e.g., high voltage) causes the OR gate 108 to place a "disable" signal on the disable input of the 10BT receiver 101, thereby allowing only the 100TX receiver 102 to remain active. Alternatively, an asserted 10BT signal causes the OR gate 109 to place a "disable" signal on the disable input of the 100TX receiver 102, thereby allowing only the 10BT receiver 101 to remain active. If the received signal does not contain proper FLP bursts, a FAIL condition will be reported by the control block 107. In this case, link information will be obtained from the signal detect blocks; SD (105) for the 100 Mb/s mode and NLP (106) for the 10 Mb/s mode.

For example, a typical prior-art solution for implementing the SD block employs a peak detector on the post-equalized receiver output. If the post-equalized signal exceeds a certain threshold level for a given time period, the SD output is asserted, indicating a 100 Mb/s link. De-assertion of the SD output occurs if the peak level of the post-equalized output falls below the threshold level in a given time period. Another prior-art technique asserts the SD output when the 100M/bs receiver phase locked-loop (used for timing recovery) acquires lock. Still another prior-art technique makes use of the adaptation output behavior to assert the SD output. In any of these cases, the asserted SD output causes the OR gate 108 to place a disable signal on the disable input of the 10BT receiver section 101. To check for 10 Mb/s activity, a typical prior-art technique is to check for the idle pattern that this line code provides. These idle patterns are termed "normal link pulses" (NLPs), and are essentially pulses with a duration of 100 ns and with a predictable period, as defined by ISO/IEC 8802-3 and ANSI/IEEE 802.3. If these pulses are detected in a given time period the NLP block 106 asserts the NLP signal. This assertion causes the OR gate 109 to place a disable signal on the disable input of the 100TX receiver section 102. In the foregoing manner, either the 100TX or 10BT signal indicators will be active so that the transceiver can decipher the capability of its link partner if the autonegotiation protocol fails. Note that an "other" output may be provided from block 107, to indicate the presence of another signal protocol (e.g., 100BT4). It is evident that the prior-art techniques requires both the 10 Mb/s and the 100 Mb/s receivers to be active during this autonegotiation phase, which can be lengthy as discussed above; thus, power dissipation in this state can be quite high.

Referring to FIG. 2, a typical implementation of an analog 100TX receiver shows various components that tend to consume significant amounts of power when activated. The baseline wander block (20) provides for correction of DC offset voltages due to asymmetrical data streams, while the automatic gain control block (21) compensates for amplitude differences. These amplitude differences may be due to the insertion loss and variations in the transmitter output, for example. The equalizer (22) corrects for varying cable lengths and differences in phase delays, and the comparators (23) provide for detection of the data, while the phase-locked loop (24) provides for recovery of the clock from the received data. Referring to FIG. 3, a typical implementation of a digital receiver includes an automatic gain control (30), an equalizer (31), an analog-to-digital converter (32) providing digital signal to a digital signal processor (33) over a bus (34). While various receiver designs differ in which of these blocks to include, they typically include most of them.

SUMMARY OF THE INVENTION

We have invented a signal rate detection technique for use in a multi-data rate receiver that uses comparators to obtain information on the incoming data for enabling the appropriate receiver section. A first comparator detects a relatively low data rate signal, and a second comparator detects a relatively high data rate signal. Logic circuitry activates a first receiver section when the first comparator detects the relatively low data rate signal, and activates the second receiver section when the second comparator detects the relatively high data rate signal.

DETAILED DESCRIPTION OF THE INVENTION

Figure 4:
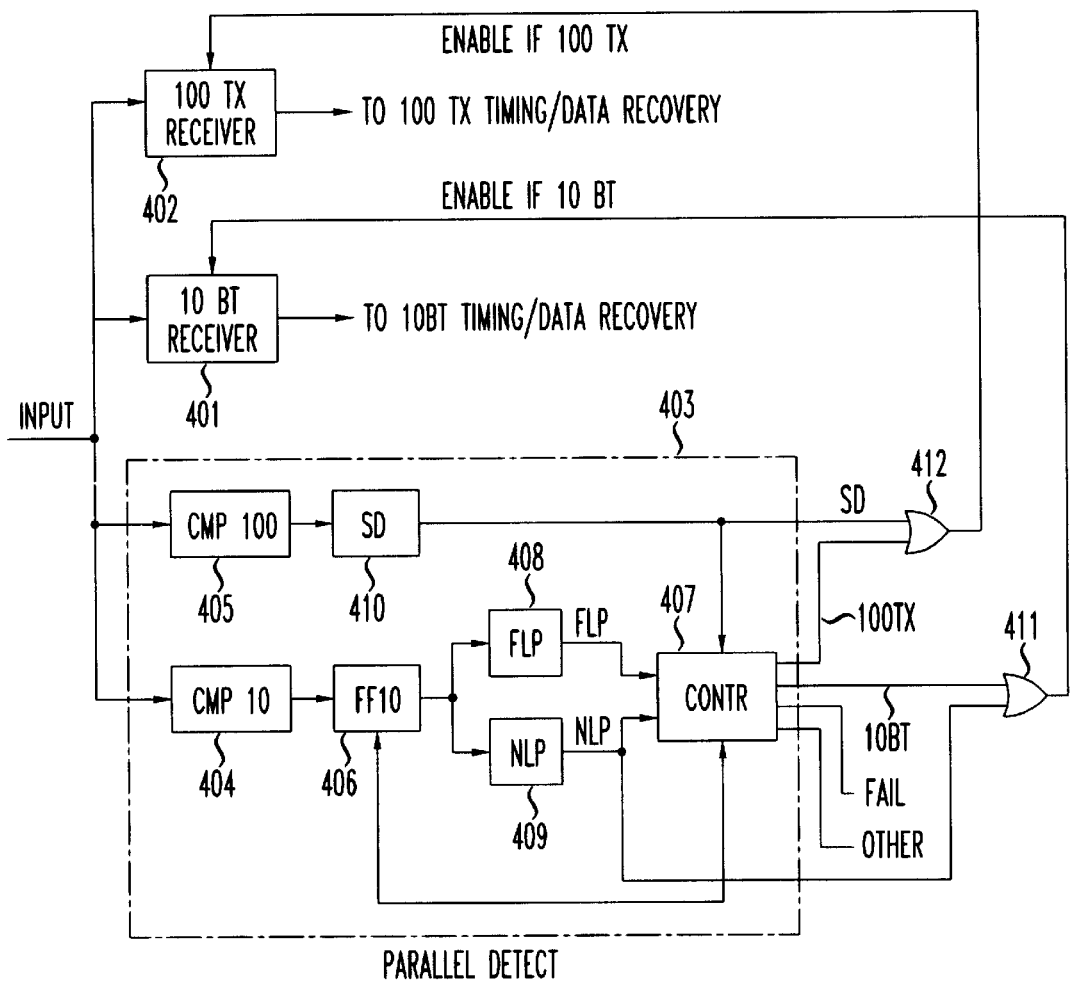
FIG. 4 shows an illustrative embodiment of the inventive multiple data-rate receiver.

The following detailed description relates to a multiple data-rate receiver that determines the rate of incoming data using comparators and logic, thereby avoiding the necessity of maintaining multiple receivers active during the autonegotiation phase. Hence, power dissipation may be kept to a minimum. FIG. 4 shows an illustrative embodiment of the inventive technique for a dual-data rate receiver employing a relatively low data rate receiver section (401) and a relatively high data rate receiver section (402). The parallel detection circuitry (403) comprises two comparators set up with different threshold levels, CMP10 (404) for 10 Mb/s data, and CMP100 (405) for 100 Mb/s data. CMP10 is also configured to reject incoming signals that exceed a certain frequency (e.g., 40 MHz). This helps ensure that CMP10 reacts only to low frequency signals, which are typically the autonegotiation pulse bursts (FLPs), or alternatively the 10BT idle patterns (NLPs). The comparator CMP10 sets a flip-flop FF10 (406) whenever the comparator output is asserted. The flip-flop FF10 is polled by the controller block (407) at regular intervals. During the polling period, the FF10 output is sent to the FLP block (408) and the NLP block (409). Once a poll is complete, the controller resets the flip-flop FF10. The FLP block makes use of the FF10 polled outcome to determine if the input sequence meets the criteria (frequency, number) of the FLP pulse bursts. If this is true, then the link is established based on the information in the pulse bursts. If this is not the case, a FAIL condition is indicated, and the transceiver makes use of the NLP or the SD outputs to determine the mode of operation. Once a mode of operation is known, the respective receiver is powered up (enabled). The NLP block works similarly to the FLP block. It makes use of the FF10 polled outcome to detect if the link integrity pattern is being transmitted, based on periodicity of the idle (NLP) pulses. If so, the 10BT signal is asserted; otherwise, it remains de-asserted. The SD block (410) determines 100 MB/s activity, which may be either a normal data signal, or the 100 Mb/s idle pattern. If either the NLP signal from block 409 or the 10BT signal from block 407 are active, then the OR gate 411 enables the 10BT receiver (401). If either the SD signal from block 410 or the 100TX signal from block 407 are active, then the OR gate 412 enables the 100TX receiver (402).

Figure 1:
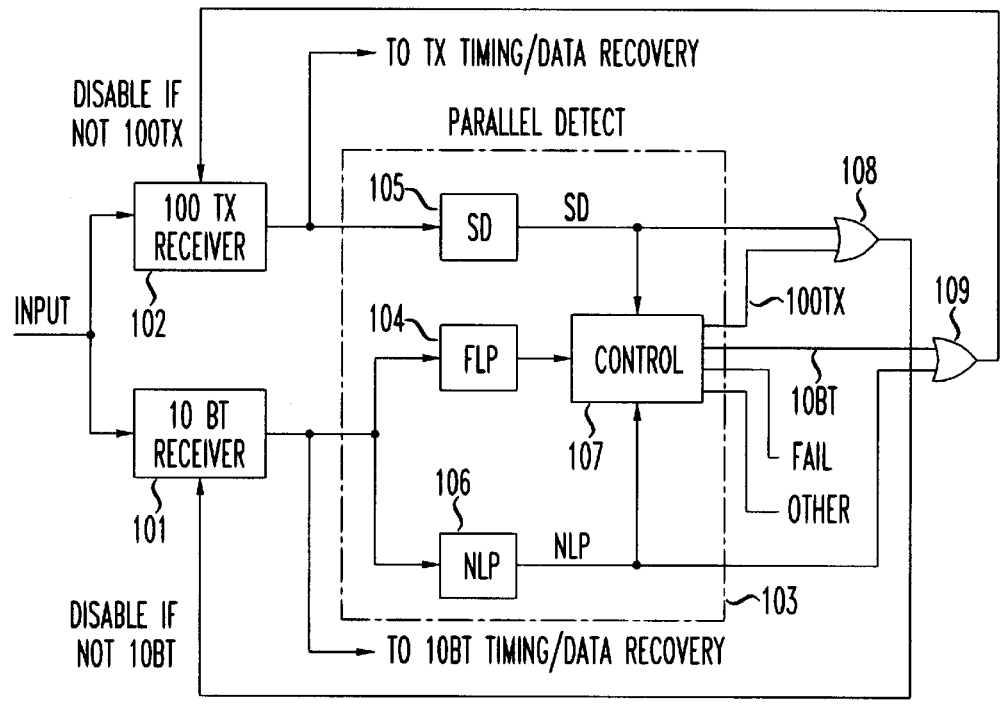
FIG. 1 shows a typical prior-art multiple data-rate receiver.
Figure 2:
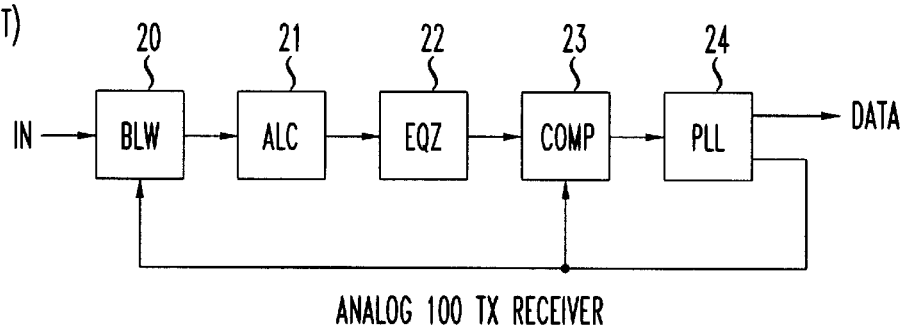
FIG. 2 shows a typical prior-art analog receiver block diagram.
Figure 3:
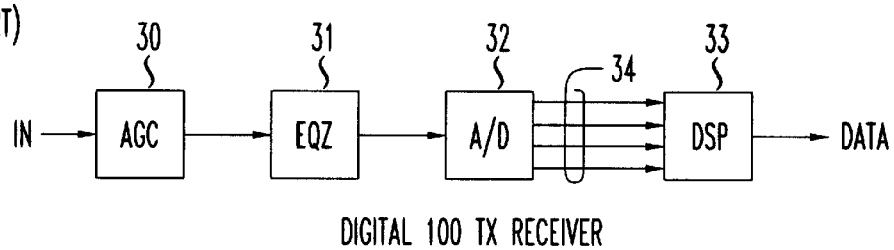
FIG. 3 shows a typical prior-art digital receiver block diagram.

In implementing the above architecture, prior-art circuitry may be used for various of the blocks. For example, the comparators 404 and 405 may be implemented using the technique described in U.S. Pat. No. 5,448,200 co-assigned herewith, with other designs being possible. The flip-flop 406 is of conventional design, and the NLP block 409 may be comparable to that in prior-art FIG. 1. The FLP block 408 is typically a state machine of conventional design, and the controller 407 is typically dedicated logic of conventional design. The receivers 401 and 402 may be conventional. The SD block 410 may be of a relatively simple design as compared to the prior-art SD block 105 in FIG. 1.

Figure 5:
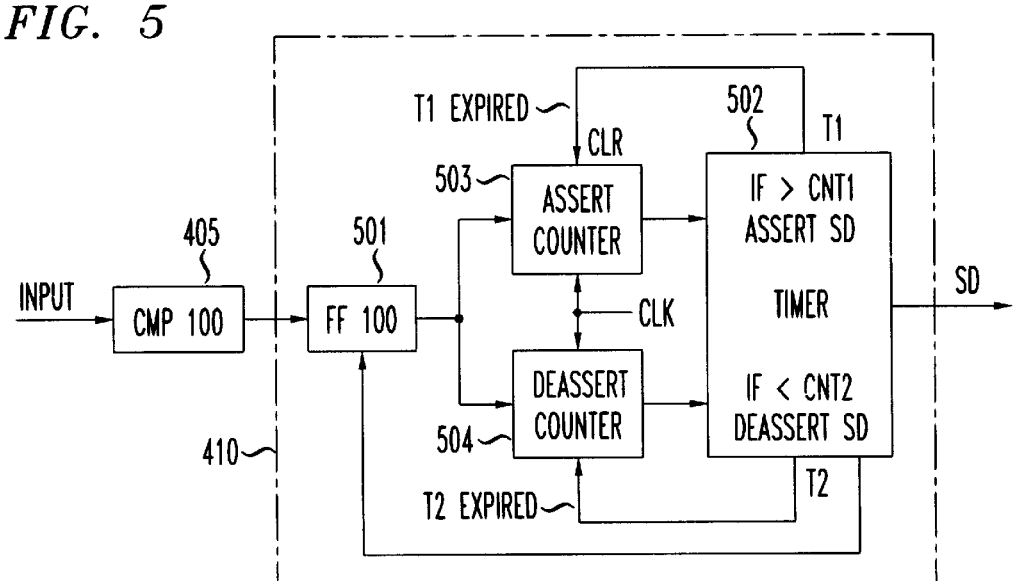
FIG. 5 shows an illustrative signal detection block suitable for use with the inventive receiver.

Referring to FIG. 5, an exemplary embodiment of SD block (410), which determines 100 Mb/s activity, works as follows: The comparator CMP100 (405), is used to detect signals exceeding a certain threshold level, VTH. If this takes place, a flip-flop FF100 (501) is set. The flip-flop output is polled periodically by the TIMER block (502). If the flip-flop is set, the assert counter (503) and de-assert counter (504) each increment by one count. The flip-flop is reset after the polling phase is complete. The SD output is asserted if the assert counter exceeds a certain count value, CNT1, within a given time period (window), T1. De-assertion of the SD output takes place if the de-assert counter does not exceed a second count value, CNT2, in the time window T2 (note that it is possible to have T1=T2). When the time window expires the respective counters are reset. The parameters VTH, T1, T2, CNT1 and CNT2 are chosen such that given the statistical nature of the 100 Mb/s signal and the attenuation of the cables supported, the SD output will assert/de-assert appropriately. In addition, the parameters T1 and CNT1 are chosen such that 100TX will not assert on 10BT idle patterns or the FLP pulse bursts. This is achieved based on the known frequency, pulse width and number of these pulses. It will be evident to one skilled in the art that both counters can be implemented with a single counter. Furthermore, the above embodiment has shown the comparators 404 and 405 implemented in separate circuit blocks, allowing for independent optimization of the design of each. However, it is alternatively possible to implement the comparison function with the same circuitry; i.e., in a common circuit block. In that case, the following logic circuitry (e.g., 406 and 410) may then receive the comparator output of the common block.

While the above embodiment of the invention has been given in terms of a dual-data rate receiver, extension to more than two data rates is possible. For example, the upcoming generation of gigabit (i.e., 1000 MB/s) transceivers may advantageously use the present technique for selectively enabling one of three receivers (i.e., 10, 100, or 1000 MB/s). The present technique may also be combined with other data rate negotiation techniques. For example, a first receiver section may provide for a 10 MB/s data rate, whereas a second receiver section may provide for both 100 MB/s and a 1000 MB/s data rates, which rate may be determined during the autonegotiation process. Still other uses of the inventive technique will be apparent to persons of skill in the art.

We claim:

1. An integrated circuit comprising a multiple data-rate receiver comprising a first receiver section adapted to receive at a relatively low data rate and a second receiver section adapted to receive at a relatively high data rate, characterized by a first comparator for detecting a relatively low data rate signal and a second comparator for detecting a relatively high data rate signal, and logic circuitry for activating said first receiver section when said first comparator detects said relatively low data rate signal and for activating said second receiver section when said second comparator detects said relatively high data rate signal.

2. The invention of claim 1 wherein said first receiver section is a digital receiver comprising an analog-to-digital converter and a digital processor.

3. The invention of claim 2 wherein said first receiver section further comprises an automatic gain control and an equalizer.

4. The invention of claim 1 wherein said second receiver section is an analog receiver comprising a comparator and a phase-locked loop.

5. The invention of claim 4 wherein said second receiver section further comprises an automatic gain control and an equalizer.

6. The invention of claim 1 wherein said first comparator and said second comparator are implemented in separate circuit blocks.

7. A method of operating a multiple data-rate receiver that comprises a first receiver section adapted to receive at a relatively low data rate and a second receiver section adapted to receive at a relatively high data rate, characterized by performing a first comparison for detecting a relatively low data rate signal and a second comparison for detecting a relatively high data rate signal, and activating said first receiver section when said first comparison detects said relatively low data rate signal and activating said second receiver section when said second comparison detects said relatively high data rate signal.

8. The invention of claim 7 wherein said first receiver section is a digital receiver comprising an analog-to-digital converter and a digital processor.

9. The invention of claim 7 wherein said second receiver section is an analog receiver comprising a comparator and a phase-locked loop.

10. The invention of claim 7 wherein said first comparison and said second comparison are performed in separate circuit blocks on the same integrated circuit.

11. A multiple data-rate receiver comprising:

a first receiver section;

a second receiver section; and detection circuitry;

wherein each of the first receiver section, the second receiver section, and the detection circuitry, receive a data signal, the first receiver section activated in response to the detection circuitry receiving the data signal at a first data rate and the second receiver section activated in response to the detection circuitry receiving the data signal at a second data rate different from the first data rate.

* * * * *